United States Patent [19]
Lillestrand et al.

[11] 3,713,740
[45] Jan. 30, 1973

[54] ASTRONOMIC SURVEY APPARATUS AND METHOD

[75] Inventors: Robert L. Lillestrand, Edina; Joseph E. Carroll, Minnetonka, both of Minn.

[73] Assignee: Control Data Corporation, Minneapolis, Minn.

[22] Filed: Sept. 20, 1967

[21] Appl. No.: 669,192

[52] U.S. Cl. ............356/141, 250/203 R, 250/237 R, 356/152
[51] Int. Cl. ............................................. G01b 11/26
[58] Field of Search..............356/141, 147, 28, 152; 250/237

[56] References Cited

UNITED STATES PATENTS

| | | |
|---|---|---|
| 2,975,289 | 3/1961 | Robert..........................356/141 X |
| 2,999,939 | 9/1961 | Bible............................356/141 |
| 3,000,255 | 9/1961 | Iddings.........................356/141 |
| 3,220,298 | 11/1965 | Powell..........................356/141 |
| 3,263,088 | 7/1966 | Goldfischer....................356/141 |
| 3,308,298 | 3/1967 | Rawls...........................356/141 |

Primary Examiner—Rodney D. Bennett, Jr.
Assistant Examiner—Joseph G. Baxter
Attorney—Paul L. Sjoquist and Joseph A. Genovese

[57] ABSTRACT

A passive star detection device comprising an optical system photodetector means and a transparent slit pattern for receiving the star radiation, and a computer for analyzing the received star radiation and calculating the azimuth and position of the device on the surface of the earth.

19 Claims, 9 Drawing Figures

ASTRONOMIC SURVEY APPARATUS AND METHOD

This invention relates to an apparatus and method for determining a precise astronomic position and north azimuth on the surface of the earth by means of star observations near the zenith. The inventive system comprises a vertically-oriented, passive astronomic surveying device and computer which, together, provide an automatic and extremely accurate indication of position and azimuth in a relatively short time. It accomplishes this operation by imaging a plurality of stars located near the zenith onto a focal surface containing a pattern of slits and electronically observing the traversals of identifiable star images across this pattern. Since the identity and position of the stars as well as the geometry of the slit pattern and its orientation relative to the instrument body are known, and the orientation of the instrument body relative to the local gravity vector has been calibrated or otherwise previously measured, the position and north azimuth orientation of the observing device can be calculated by measuring the times at which these known stars traverse the slits. Because the system depends for its operation upon the relative movement of stars with respect to the earth, the measurement interval must be long enough to allow this movement to take place. Typically, a measurement interval on the order of 10 to 60 minutes is sufficient for this purpose.

Position-fixing by means of star observations is not new in the art, but the particular method and apparatus described herein represent a significant improvement over previous approaches to this problem. It has long been known that a sextant can provide a position fix with a limited accuracy which is usually sufficient for surface navigation. Star trackers have also been used for this purpose, but they have a disadvantage in that they generally require rather complex tracking equipment if automatic operation is desired. Observations made using a theodolite provide quite accurate position information, but require a relatively long measurement interval, post-observation data reduction, and manual pointing. An additional contrasting feature should be pointed out in relation to star trackers. These latter devices many times employ a chopper disk or other non-specific scanning reticle. The slit reticle in the present invention differs from this in two respects: (a) it does not move relative to the remainder of the inventive apparatus, and (b) position and azimuth information is based on a knowledge not only of the star identity but also of that of the particular slit traversed. In this latter respect, it employs specific scanning (scanning motion being provided by earth rotation) in contrast to a star tracker's non-specific scanning.

The present invention provides an accurate position fix and north azimuth which are immediately available because all observation data is automatically fed into a computer and processed as the observations are being made. Furthermore, the observations are completely automatic. Impersonal detection and automated computation eliminate operator errors. The relatively small size of the system makes it extremely useful as a portable survey device, and this portability combined with the highly accurate results obtained, provide the potential for revolutionizing surveying techniques. A typical system occupies about 1½ cubic feet of volume and is accurate to within 100 feet anywhere on the surface of the earth. Azimuth accuracy is better than 10 seconds of arc.

It is therefore apparent that the principal object of this invention is to provide a very accurate survey system which uses astronomic measurement techniques.

Another object of this invention is to provide a survey system which is sufficiently small in size as to be easily portable.

Another object of the invention is to provide a sensor design which is insensitive to vertical atmospheric refraction, most optical aberrations, and focal length changes.

Another object of the invention is to provide a portable, automatic instrument whose accuracy is independent of small manufacturing and leveling errors.

Another object of this invention is to provide a small, accurate survey system which requires only a short measurement interval to produce its results.

Another object of this invention is to provide a survey system which is passive in operation and impersonal during the measurement interval, thereby eliminating errors caused by human misadjustment or misjudgement.

Another object of this invention is to provide a portable automatic sensor design which measures north azimuth as well as position in a single unified sequence.

Another object of this invention is to provide a survey system which can tolerate slow changes in azimuth setting and level status.

Briefly, this invention includes a celestial sensor mounted vertically to allow stars to pass over head, and electrical apparatus for sensing and computing position and azimuth information from these traversing stars. Since what is computed is the pointing direction of the optical axis, vertical mounting (or its equivalent) of the star sensor is required in order to achieve a high degree of accuracy. In the inventive system this is accomplished by mounting the celestial sensor on a horizontal bearing which allows the sensor to be rotated 180°. By taking measurements in both the 0° and 180° orientations, optical axis-bearing axis misalignments are cancelled; the pointing direction of the bearing axis is computed. The system also includes a two-axis level indicator which, when read in the 0° and 180° orientations, provides a measure of the angle between the true vertical and the bearing axis. The level indicator outputs are converted to electrical signals and fed into the computer where they are combined with the bearing axis determination to yield the celestial pointing direction of the true vertical and, therefore, the true position of the observing instrument.

An alternate, though less favorable, method of achieving vertical mounting involves two-axis pendulous suspension of the sensor. Measurements in the 0° and 180° orientations are still required to cancel alignment errors caused by imprecise location of the pendulum center of gravity. However, no level indicator apparatus is required since the pendulum returns always to a repeatable position relative to the gravity vector. Historically, pendulums have achieved less accuracy in indicating local vertical than liquid surfaces. For this reason, the preferred embodiment of this invention includes a rigidly mounted sensor and a level indicator, the latter employing a liquid surface as level reference.

The sensor includes a lens, an opaque disk with a predetermined slit pattern located at the focal position of the lens, and a photo-detector for sensing light that passes through the slit pattern. There are no moving parts in the sensor during measurement. Earth rotation causes star motion across the slit pattern. The photo-detector output is an electrical signal which is amplified and converted into a set of binary signals representative of its magnitude. A precision electronic clock is utilized to obtain precise timing of the binary signals and therefore of each star transit past each slit. The binary signals representative of stars passing overhead and the precision clock signals are coupled into a computer, which calculates the sensor position from this information and other information which is prestored in the computer. The computer output is coupled to a display panel which provides a numerical display for the benefit of the operator. A keyboard is also provided to allow the operator to input information into the computer.

The invention will become more fully apparent when considered in light of the following detailed description of an illustrative embodiment and from the appended claims.

The illustrative embodiment may be best understood by reference to the accompanying drawings.

Figure 1:
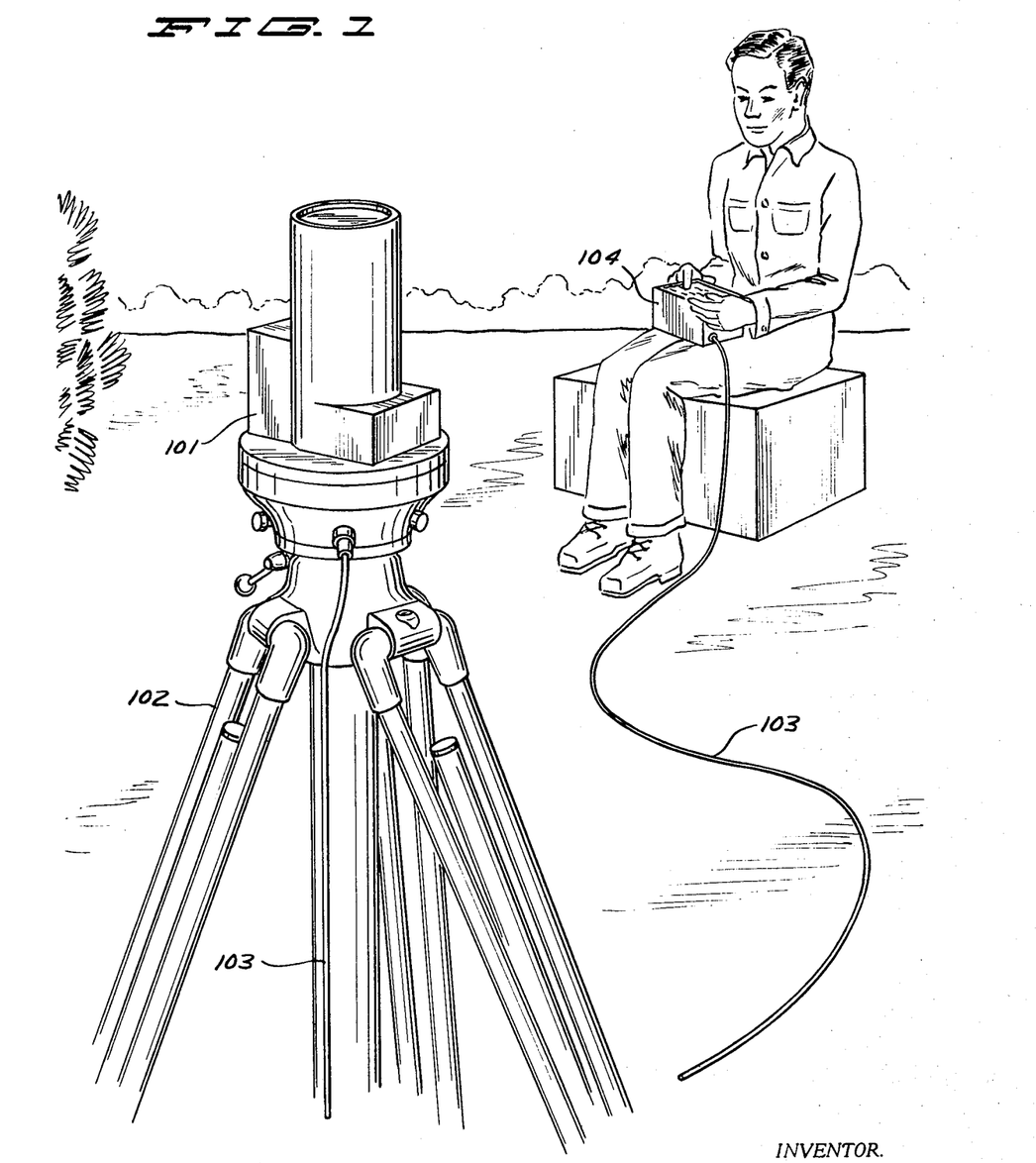
FIG. 1 pictorially illustrates the entire system.

Referring now to the figures, the invention will be described in detail. FIG. 1 illustrates a sensor 101 mounted on a tripod 102. The sensor 101 contains an optical system for focusing starlight upon a disk which has a predetermined slit pattern, and a photo-detector which receives the starlight that passes through the slits. The output of the photo-detector is converted into a series of binary signals representative of the magnitude of the input light. These binary signals are passed over a cable 103 to a remote unit 104. The remote unit 104 contains a miniature digital computer which calculates the latitude, longitude, and azimuth of the sensor. Tripod 102 provides a means for obtaining a stable mounting plane upon which to mount sensor 101. Any other mounting means could be used which would satisfy the requirement that the optical system of the sensor 101 be maintained in a stable vertical orientation. For example, as explained previously, sensor 101 could equally well be hung in a pendulous configuration so that the earth's gravitational field would provide the required vertical orientation.

Figure 2:
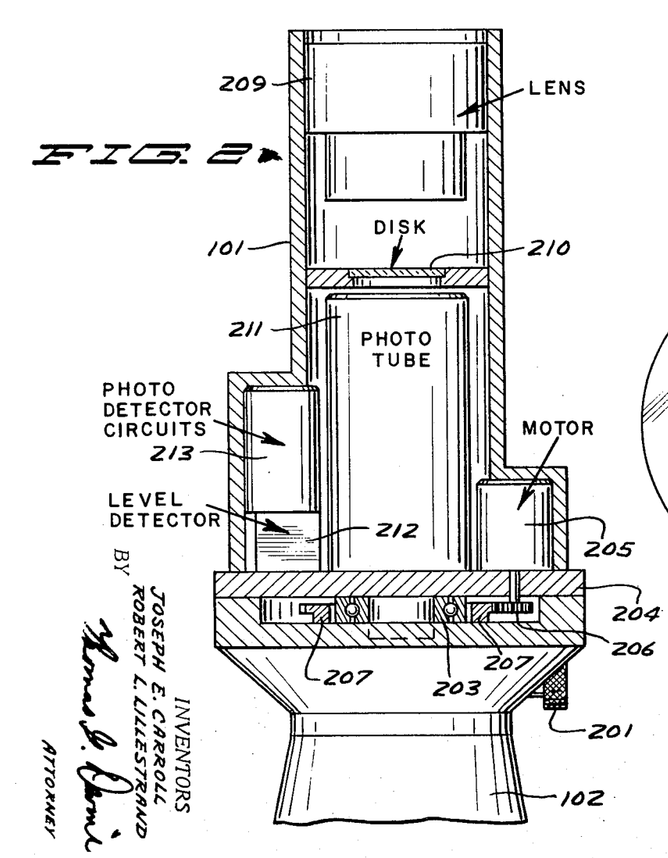
FIG. 2 illustrates the tripod-mounted sensing unit.

FIG. 2 illustrates the equipment contained within the sensor 101. Also shown is a portion of the tripod 102 and a sensor leveling adjustment 201. Bubble vials (not shown) are provided to facilitate approximate level adjustment.

The sensor is rotatably mounted by means of a bearing 203. The bearing 203 enables the sensor to be rotated 180° between measurement intervals to cancel alignment errors and to measure initial leveling errors. Mounting plate 204 rides on bearing 203 and provides a stable mounting base for the equipment contained in the sensor. The rotation of the sensor is accomplished by means of a motor 205 which drives the sensor against one of two stops (not shown) symetrically located 180° from each other. The motor is energized from the remote control unit (FIG. 1) and drives the sensor by means of a gear 206. This gear engages a mating gear 207 which is attached to a portion of the sensor fixed relative to the tripod base. Thus, the means for rotating the sensor 180° is entirely self-contained in the instrument. This allows all torques to be totally self-contained in the instrument and eliminates errors which might be caused by the operator if he were required to come into contact with the instrument. Typically, the drive motor operates through a gear system which gives a rotation rate of approximately 6 rpm to the sensor.

FIG. 2 also illustrates the layout of the optical components of the sensor. Lens 209 focuses light on disk 210 which contains a predetermined pattern of slits. Except for the slit pattern, disk 210 is opaque and therefore allows light to pass through to the photomultiplier tube 211 only via the slit pattern. The photomultiplier tube 211 is of a type which is well-known in the art and is commercially available. The EMR-543A-01-14 tube is typical of those well suited to this application. Alternately, solid state photodetectors of the conduction or voltaic type may be used. The electronic circuitry 213 required to operate the photodetector is contained in the sensor 101 and includes power supplies, pre-amplifier, and electronic filters and amplifiers for generating an output voltage signal which is representative of the light impinging upon the photodetector and for transmitting this electrical voltage signal via cable 103 to the computer contained in the remote unit. This voltage signal is converted to a series of binary signals by an analog-to-digital converter and the binary signals are sampled by the computer at a rate such that a sufficient number of samples (e.g. 10) are taken during the time of star transit. Thus, the computer receives periodic digital signals representative of the light impinging upon the photodetector 211 via the slit pattern on disk 210. An alternate electronic design, would involve generating a pulse each time the output signal from photomultiplier 211 rises above and drops below a fixed bias level. The times of these pulses would then serve as the basis for determining star-slit transit time. The preferred embodiment employs periodic sampling, however, since this provides more information from which the computer can determine transit time. The detailed electronic design is well known in the art and can be accomplished by one who is skilled in the art.

FIG. 2 also illustrates the two-axis level detector 212, which indicates angular deviation between its axis and the true vertical. The indicator chosen for the present embodiment is a combination of a two-axis electronic autocollimator and a mercury pool. The output from the level detector is a voltage signal which is connected to the remote unit via cable 103. The voltage signal is converted into a series of binary signals by means of an analog-to-digital converter and sensed by the digital computer located in the remote unit. By means of this connection, the digital computer senses the instantaneous level status of the sensor. By taking such readings in the 0° and 180° orientation of the bearing 203, the level status of the bearing plane can also be determined. For example, let $R_x(0°)$ and $R_x(180°)$ be level readings along the X-axis of the indicator in the 0° and 180° bearing orientations respectively. Then the x-component of bearing mislevel is given by one-half their difference:

$$\tfrac{1}{2}(R_x(0°) - R_x(180°)).$$

Used in this way, precise alignment between level detector and bearing plane is not required.

The level detector 212 is also used to indicate changes in level which may occur during the measurement sequence. The computer senses these changes and inserts corrective quantities in the solution equations to compensate for these level shifts.

Auxiliary electronics required by the level detector 212 such as power supplies, amplifiers, demodulators, detectors, and line drivers are included in the sensor 101.

The field of view of the optical system is related to the dimmest star detectable by the photodetector 211 and the desired average transit rate. A typical combination suitable for the present embodiment is: field of view = 13°, total number of radial slits = 26, limiting detectable star magnitude = 6.0, average rate of star transits = one transit per minute.

Figures 3A, 3B, 3C:
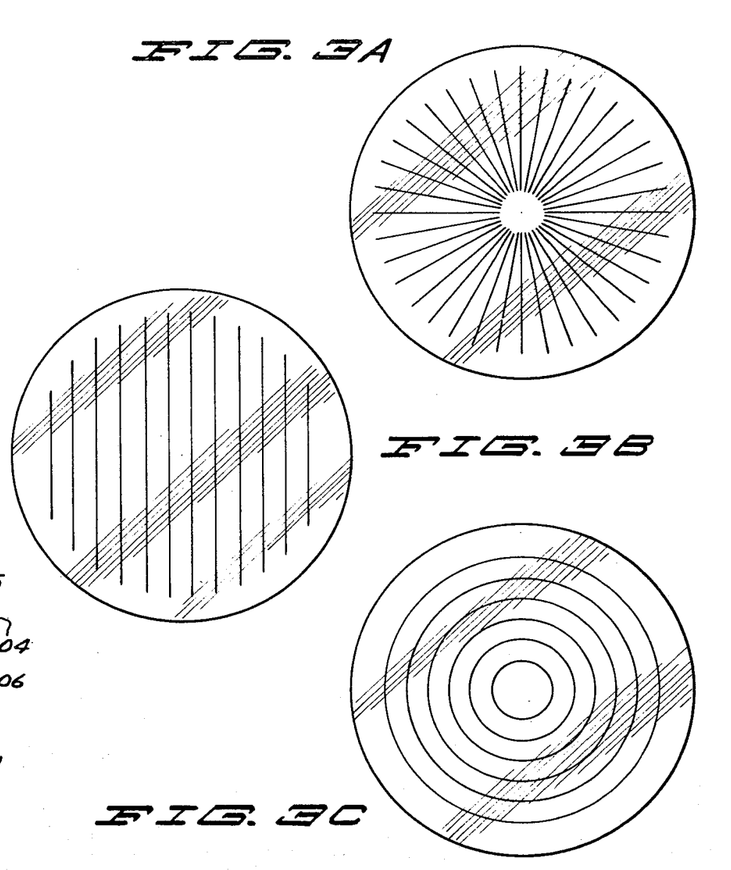
FIGS. 3a, 3b and 3c illustrates three typical slit patterns which may be used in this invention.

FIG. 3 illustrates three slit patterns which are illustrative of those which may be used with this invention. These slits are fabricated either by scribing or etching a metal-coated optically flat glass disk. The width of the slits is chosen to equal the average blur circle diameter. The blur circle diameter is defined as the image diameter of a star as focused on the face of the disk. Typically, slit widths in the range 0.0002 to 0.002 inch are used.

FIG. 3A illustrates a radial slit pattern. Radial slits may be equally spaced or irregularly spaced, so long as the pattern is defined. For example, a slit pattern could contain 36 radial slits, each separated from the adjacent slit by an angle of 6°, with the pattern extending 360° around the entire circular disk. The portion near the optical axis is made opaque to prevent star crossings which would occur in this region from producing ambiguous transits.

The use of radial slits has advantages over other types of slit patterns. A radial pattern is insensitive to variations in the zenith angle of a star caused by vertical atmospheric refraction of the starlight. It is also insensitive to errors due to focal length changes, radial distortions, or radially symmetric optical aberrations, all of which are caused by lens imperfections or variations. Because of these advantages, the radial slit pattern is a preferred pattern for use with this invention, although other patterns may be used. The full potential of the radial slit pattern can be realized by positioning the slits at the sagittal image surface of an optical system with astigmatic aberration. In this manner, the star pulse width during transit is sharply defined.

The radial pattern shown in FIG. 3A has the further advantage over the circular pattern shown in FIG. 3C in that the former can be used in the region of the poles while the latter will not experience any transits there.

FIG. 3B illustrates a straight line slit pattern which may be used in this invention. When the straight line pattern is aligned in a north/south direction, the longitude of the sensor can be calculated, although latitude calculations are not possible. This had the advantage that no leveling is necessary in the north/south direction and the equipment may therefore be simpler to set up prior to the measurement interval.

FIG. 3C illustrates a circular or almucanter slit pattern which has certain inherent advantages. This slit pattern will provide latitude and longitude information, but no azimuth information. The pattern requires no azimuth alignment or azimuth axis stability. In a manner similar to that used with radial slits in minimizing the effect of astigmatic aberrations, the circular slit pattern can be positioned at the tangential image surface of the optical system.

Radial slit pattern FIG. 3A and the circular slit pattern FIG. 3C are analogous to two classical techniques used for earth surface positioning. If the optical axis is perfectly aligned with the local vertical, stars transiting the circular slits of FIG. 3C are at constant zenith angles at the times of transit, which angles are defined by the slits. Thus, a star transit is equivalent to measuring its zenith angle at the instant of transit. Zenith angle measurement, however, is the most common technique for earth surface position fixing. Typical instruments used for this measurement are the theodolite and sextant. Thus, the circular slits of FIG. 3C can be considered as discrete zenith angle marks across which stars transit. The radial slit pattern of FIG. 3A can similarly be considered as a series of discrete azimuth marks across which stars transit. This is analogous to using only the horizontal circle readings on a theodolite. Position fixes based in this manner upon stellar azimuth measurements have not been as common as those which employ zenith angles, especially for high precision work. The difficulty here appears to be that, in determining the azimuth angular separation of a pair of stars, the theodolite must be rotated about the vertical axis from one star to the next. During such a rotation, the "zero" of the horizontal circle may shift. If it does, errors are introduced which cannot be cancelled either by repeated measurements or by the common technique of plunging. Utilization of radial slits in the present invention is not subject to this systematic error since the instrument is not disturbed between star transits.

In place of each slit could be substituted a series of variably-spaced slits in the fashion of a code. Such a code pattern could enhance the detection capability of the sensor for faint stars. In addition, it could provide a signature easily recognizable by the star recognition program as explained later.

Figures 4, 7:
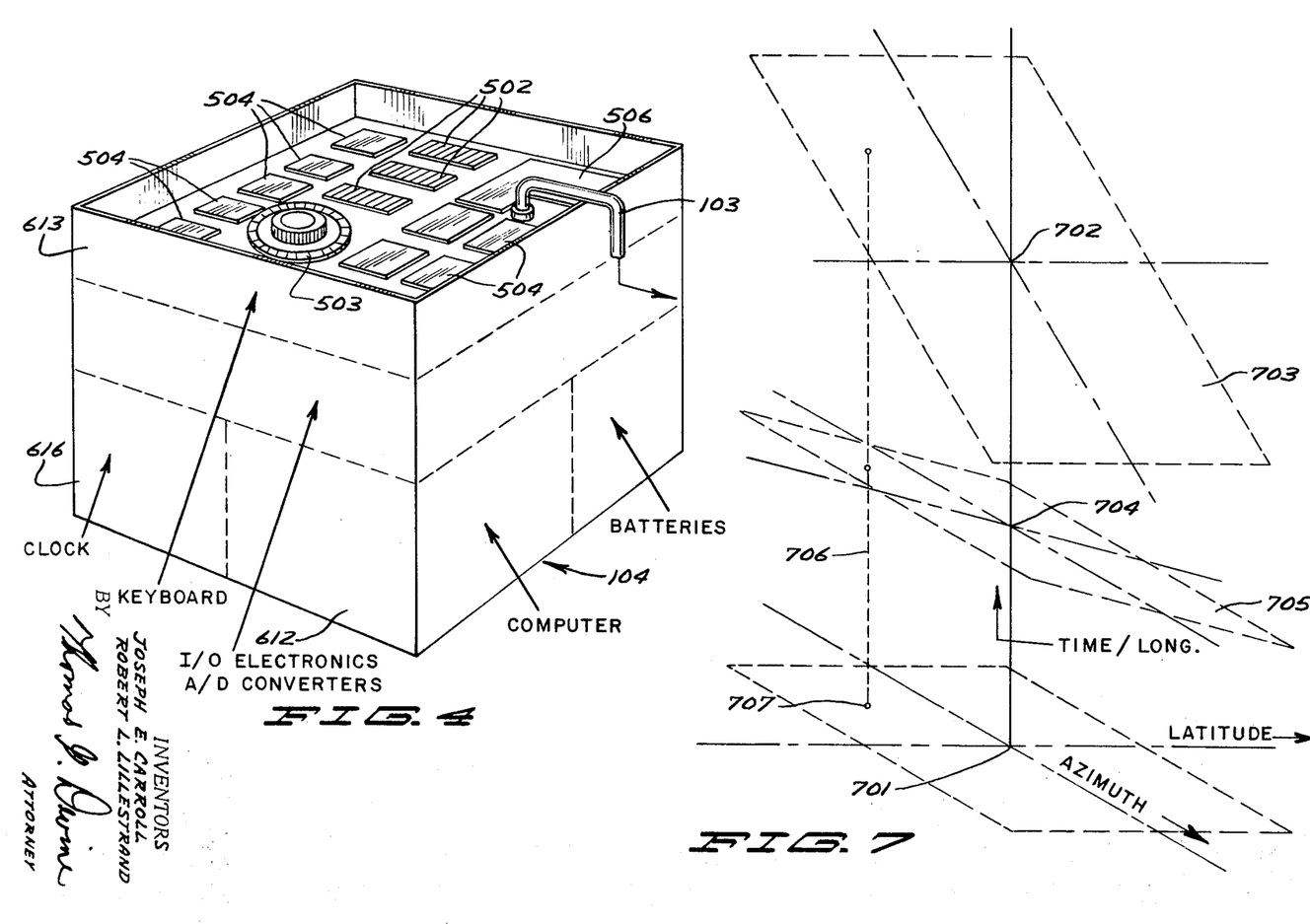
FIG. 4 illustrates the remote control unit.
FIG. 7 is a plot showing variations in star transit times for variations in position and azimuth of the sensor.

FIG. 4 illustrates the remote control unit 104. Also illustrated is the cable 103, which electrically connects the remote unit 104 with the sensor 101. The use of this control unit enables the operator to control and monitor system operation without having to come into contact with the sensor while it is operating, thereby minimizing effects of local ground distortions caused by operator motion. The displays and switches illustrated on the control panel are standard components which are readily available on the commercial market. The control panel layout illustrated by FIG. 4 is only typical of the type of layout which can be utilized by this invention and is not intended to limit the scope of this invention; other display and switch arrangements could also be selected using well-known design techniques to provide essentially similar functions. Two methods of entering numerical values into the computer are provided: input dial 503 enables entry of any of the dial setting quantities, and push buttons 504 enable entry of specific computer commands. Numerical displays 502 provide a means for the operator to read result quantities from the computer. These displays are connected to the computer and are energized by the computer or by depressing one of the switches 504. Indicators 506 consist of a plurality of lamps which are lighted under command of the computer to indicate operating status including errors such as improper entries or computer failures.

Figure 5:
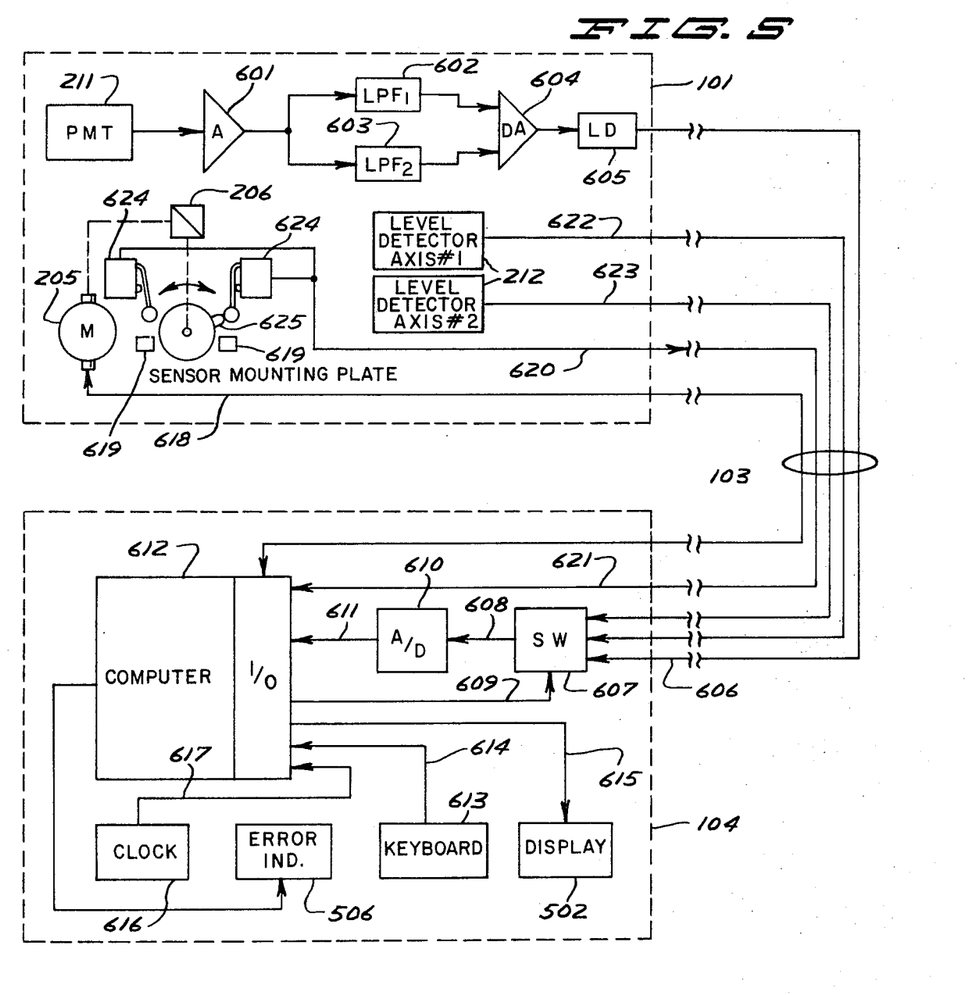
FIG. 5 schematically illustrates in block diagram form the system elements and electrical interconnections.

FIG. 5 illustrates an electro-mechanical block diagram of the system, including the equipment contained within sensor 101, its interconnections with cable 103, and the equipment contained within remote unit 104. The photomultiplier tube 211 is coupled into a preamplifier 601 which amplifies the electrical signals generated by the photomultiplier. Since the amplified photomultiplier signal contains significant proportions of photon and dark current noise, the output of preamplifier 601 is coupled into two low pass filters $LPF_1$ and $LPF_2$, 602 and 603 respectively. Filter 602 eliminates the high frequency components of the preamplifier output signal, which components are due primarily to noise, yielding a filter output signal which is a gaussion pulse with random parameters to first order. Filter 603 is designed to eliminate all noise and signal frequency components, except those which are slowly varying with respect to time and which are representative of the slowly varying stellar background radiation. The output signals from filters 602 and 603 are coupled into a differential amplifier 604, which provides an output signal representative of the difference between the two filter signals. The output from differential amplifier 604 is connected to a cable line driver 605, which provides a signal suitable for transmission over cable 103 to the remote unit 104. This signal is time varying in amplitude in correspondence with the passage of a star image over a slit in disk 210.

The signal from line driver 605 is connected to electronic switch 607 via line 606. Electronic switch 607 has a plurality of input lines and a single output line 608, and is capable of switching the signal on any one of its input lines to output line 608 upon application of a control signal to control lines 609. Control lines 609 are energized under computer control, thereby enabling the computer to select one of a plurality of input signals at switch 607 for connection via output line 608 to the analog-to-digital converter 610. Analog-to-digital converter 610 converts the instantaneous analog signal present at its input into an eight bit binary number. The computer, at a rate of ten samples per second, samples the output of this converter over lines 611 and processes the samples to determine, using a curve fitting procedure, the time the star is centered in the slit. This processing technique is made possible because of the high speed of the computer and the slow drift rate of a star over the slits in disk 210.

Computer 612 comprises a general purpose digital computer capable of performing input-output information transfers, logical decisions, numerical calculations, and other functions which are common in the art relating to computers. A computer suitable for this operation is the Control Data 449 Computer, which is a general purpose miniaturized computer weighing 7 lbs., having a power consumption of approximately 4 watts, and occupying only 64 cubic inches. Other computers could be utilized in this invention equally well, providing they could meet reasonable requirements of portability, power consumption, and speed of operation.

Input dial 503 and push buttons 504 (see FIG. 4) are illustrated in FIG. 5 as keyboard 613. Keyboard 613 is connected to computer 612 via lines 14 and a computer input channel. When keyboard 613 is activated by the means previously described, it generates signals over lines 614 which are sensed by computer 612, causing the computer to read and process information contained in the various switches within keyboard 613.

Display 502 is connected to a computer output channel via lines 615. The computer 612 selectively activates lines 615 to energize combinations of numerical display quantities. Indicators 506 are activated by various error and status indications which occur within computer 612 as described previously.

Clock 616 provides a precision time base from which star transit times may be measured to obtain accurate position fixes. The clock contains a one megahertz oscillator which is stable to better than one part in $10^7$ to enable the maximum time drift over a 14 hour period to be less than 5 milliseconds. The clock is capable of being synchronized with a standard time base such as WWV. Coupled to the oscillator are 36 binary stages comprising a digital ripple counter which permits a 19-hour countdown. The computer reads the clock by successively inputting the upper two 12-bit portions of the counter. These upper 24 bits of the counter provide a resolution of 4 milliseconds, which is adequate for the accuracy requirements of this invention.

Motor 205 illustrated in FIG. 5 provides a means for rotating the sensor 101 by 180° for the purpose of cancelling alignment errors. Motor 205 is energized by a signal over line 618 which originates at computer 612. The motor causes the sensor 101 to rotate through drive gear 206. The completion of this rotation is sensed by microswitch 624 via cam 625. Microswitch 624 provides an output signal which is coupled to computer 612 via line 620, cable 103, and line 621. When this occurs, computer 612 deenergizes motor drive line 618 and stops the rotation of sensor 101. Placement of microswitch 624 and stop 619 are such as to bring the sensor cam 625 gently to rest against the stop 619 without excessive shock or vibration. In this manner, the rotation of sensor 101 is made completely automatic, requiring no operator contact with the sensor.

Level detector 212 provides electronic output signals representative of the sensor level status during system operation. This detector senses level in two coordinate directions. Output signals are connected to computer 612 via lines 622 and 623 respectively, cable 103, switch 607, analog-to-digital converter 610, and lines 611. The operation of switch 607 and analog-to-digital converter 610 have been described previously and need not be repeated. Computer 612 periodically energizes switch control lines 609 to enable the level detector signals to be inputted into the computer via lines 611. When the computer recognizes that level changes have occurred, it modifies the analytical quantities in the equations which is solves to correct for these changes. In addition, level readings are made in the 0° and 180° sensor orientations to determine absolute bearing level status as previously explained.

Figure 6:
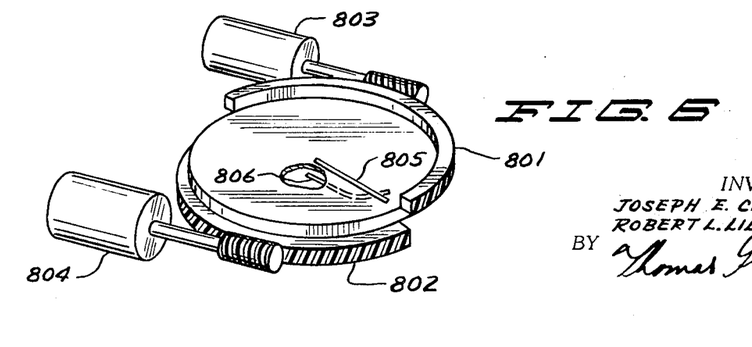
FIG. 6 illustrates additional apparatus which may be added to the survey system for eliminating background radiation such as that which occurs during daylight operation.

FIG. 6 illustrates a mechanism which may be attached to the sensor of the present invention to make the invention useful under conditions of extremely high background radiation such as occur during the daytime. This mechanism is mounted over the disk 210 to limit the amount of light which is received by the detector. It consists of a pair of disks 801 and 802 overlapping one another and capable of being independently rotated about their axes. Disk 801 is rotated by means of drive motor 803, and disk 802 is rotated by means of drive motor 804. These drive motors are energized by electrical commands originating in the computer. Disk 801 has a single radial slit 805 which has a width of typically 0.020 inch. Disk 802 has a curved slit 806 which has a typical radial width of 0.035 inch. The geometries of these slits are such that when they are placed above one another in an intersecting relationship, only the small amount of light admitted through the area of their intersection is permitted to pass through to the slit pattern contained on disk 210 which is mounted beneath disks 801 and 802.

The operation of this portion of the invention depends upon some initial information regarding position and azimuth of the sensor. If this azimuth and position information is fed into the computer, the computer calculates when a star is about to transit a given slit in disk 210 and where along the slit the star traversal will occur. The computer then commands the disk drive motors 803 and 804 to rotate disks 801 and 802 such that the small aperture formed by the intersection of the disk slits 805 and 806 is positioned over this calculated location. This small aperture then limits the amount of background radiation falling on the detector such that the star can be detected upon transit. When the star transit occurs, the computer records the time of transit and performs calculations similar to those previously described to determine the exact position and azimuth of the sensor.

The foregoing detailed description of the apparatus of this invention having been completed, the method of its operation will now be summarized. Briefly, the method steps which are involved are as follows:

1. Leveling and aligning the sensor equipment (or its equivalent);
2. Observing at least three star transits;
3. Recording the times of star transits;
4. Identifying the transiting stars;
5. Calculating the sensor latitude, longitude, and azimuth using the recorded transit times and identified star information.

The operation step of leveling the equipment may be accomplished in several ways. The equipment may be initially coarse leveled to an accuracy of approximately 1/10°, and the extent of misleveling later measured by means of rotating the sensor 180° and measuring the degree of misleveling as was previously described. Compensation for deviations in level which occur during the measurement interval may be made analytically, by means of computer program variables which adjust the equation coefficients to correspond to the amount of misleveling which is measured as was also previously described. Compensation for level deviations could also be accomplished by the addition of a control system to sense level changes and feedback these level errors to realign the sensor mechanism. If north azimuth orientation is desired as one of the calculated quantities (in step 5), and uniformly-spaced radial slits are used, this step must also include aligning an index reference line on the instrument within a few degrees of a point having a known north azimuth.

The step of observing at least three star transits is required because there are three quantities: latitude, longitude, and azimuth, which must be solved for. This step may be satisfied by the traversal of a single star over three slits, three stars over a single slit, or any traversal sequence which yields three independent star-slit measurements. The confidence level of the equation solutions improves considerably as more star transits are observed, and as the number of these observations increase, the computer is able to compute the probable error in each of the computed quantities. The computer is therefore able to not only compute latitude, longitude and azimuth of the sensor to a high degree of precision, but is also able to evaluate the precision attained. Thus the operator is permitted to obtain both absolute position information and the precision to which this position information is computed.

The step of recording the times of star transits is accomplished automatically through the use of a precision clock in the system. The computer merely notes the clock readings at each instant that the photodetector output signal is sampled. After a star transit has been completed, the computer, utilizing a curve-fitting procedure, assembles the sampled outputs into a pulse shape. The time corresponding to the centroid of this pulse shape is the time at which the star was centered in the slit.

The step of identifying the transiting stars is accomplished by means of a star catalog and the geometry of the slit pattern, all of which are prestored in the computer memory. Reference is made to FIG. 7, which is a diagram showing an example of the effect of latitude and azimuth changes on the pattern of computed star transit times. Axes labeled "azimuth", "latitude", and "time/longitude are mutually perpendicular. Intersection 701 indicates initially assumed values for azimuth and latitude. Longitude is not separately called out since it is interchangeable one-for-one with time. The star catalog and slit pattern geometry, together with the initial position and azimuth estimates enable the computer to determine the expected time of transit of each star across each slit. Intersection 702 indicates the time of transit for a particular star/slit combination and initial azimuth and latitude 701. Surface 703 is a family of points 702 belonging all to the same star/slit combination for various values of azimuth and latitude near to the initial estimates 701. Similarly, surface 705 is a family of points 704 for another star/slit combination. Each star/slit combination gives rise to such a surface; only two are shown in FIG. 7. Thus, a vertical line 706 placed above a given azimuth and latitude point 707 will intersect surfaces 703, 705, etc. in a plurality of points. The relative distances of these points along line 706 are thus a measure of the star/slit transit times for the new azimuth and latitude 707. The surfaces 703, 705, etc. can be approximated by planes in the neighborhood of initial estimates 701. This will greatly simplify computation complexity since only three quantities need be determined for each plane. The disadvantage is that the parameters of each plane are based on estimates 701, and therefore any new estimates, e.g. 707, will produce transit times which are in error by an increasing amount as 707 deviates from 701. If, during the subsequent attempt to correlate measured and computed transit time patterns, position and azimuth estimates change by more than, say, 5°, then a new computation of the plane parameters of FIG. 7 should be performed using these new estimates to avoid excessive errors which could lead to a false identification.

The observed times of transit of stars across slits on disk 210 are collected and recorded by the computer as explained above. This collection is termed the measured time pattern of star transits. The computer program then correlates this measured pattern with the expected time pattern as follows. In FIG. 7, let dotted line 706 with its time marks represent the measured time pattern of star transits. The computer then moves this line along the azimuth, latitude, and time axes until a near coincidence occurs between the time marks along line 706 and the intersections of line 706 with planes 703, 705, etc. When an approximate coincidence has thus been attained, the new azimuth, latitude, and longitude are much better estimates of the true quantities. Furthermore, the measured star transits have been correlated with the expected star transits and can thus easily be identified as to particular star and slit. To increase efficiency and reduce the probability of false identifications, the correlation process should make use of transits only of the brightest available stars. Once sufficient agreement has been established between the time patterns, the identification of dim stars is then much easier and straight forward. If accurate estimates are available of sensor position and azimuth, it is evident that this greatly simplifies the above pattern recognition sequence and shortens the calculation interval.

The above implementation of the star identification step requires that an approximate knowledge of position and azimuth be available. If such information is likely to be grossly in error, then an alternate arrangement must be employed. The techniques which would be of help in this case are: (a) replacement of each =by a plurality of slits arranged in a code form and (b) replacement of the single photodetector with a plurality of photodetectors, one for each slit (practical in the case of solid state devices). In each case, the slit transited is identified, thereby severely restricting the range of geometries possible and making ultimate identification more reliable and rapid.

The step of calculating latitude, longitude, and azimuth of the sensor involves the solution of a series of equations of the type:

$$\cot \beta_j \sin (\alpha_i - \alpha) + \sin \lambda \cos (\alpha_i - \alpha) - \tan \delta \cos \lambda = 0$$

wherein $\delta_j = (\beta + \theta_j)$ is the north azimuth of the $j^{th}$ slit, $\beta$ is the north azimuth of a reference mark in the sensor, $\theta_j$ is the azimuth angle of the $j^{th}$ slit measured from the reference mark, $\alpha_i$ and $\delta_i$ are the right ascension and declination respectively of the $i^{th}$ star, $\lambda$ is the sensor latitude, $\alpha = L + GHA \gamma$ is the right ascension corresponding to the sensor longitude $L$, and $GHA\gamma$ is the Greenwich Hour Angle of Aries found in such standard texts as the *American Ephemersis and Nautical Almanac* and the Explanatory Supplement thereto. An equation such as above exists for each star-slit transit. An iterative procedure is used to compute final values starting with the initial estimated quantities. This computation is done according to the technique of least squares, or a technique known as the Kalman filter technique, which allows the inclusion of each measurement as it occurs and at the same time evaluates the quality of the resulting solution. The Kalman filter technique is a logical extension of the least squares technique and can be applied during the time that measurements are being made, giving the operator information relating to the state of solution and the error yet remaining at any instant. This allows the operator to monitor the length and accuracy of the position fix operation.

The inventive techniques described herein could also be performed without an automatic computer, although the operation would then become more time-consuming. For example, the photodetector output signal could be applied to activate a chart recording mecahnism, and the task of star identification could be accomplished manually. Latitude, longitude, and north azimuth orientation could then be calculated either manually or automatically in the field or at a central data processing station.

Radiation from sources other than stars can equally well be utilized with this invention. For example, radiation from orbiting satellites, planets, or other celestial objects having known positions will also enable a solution of the equations yielding position and north azimuth orientation. Of course, once the position of the sensor is known, the invention can also be utilized to detect radiation from celestial sources having unknown positions and the position or orbital parameters of these sources can be calculated.

The apparatus and method steps disclosed herein are examples of those in which the inventive features of this disclosure may be utilized, and it will become apparent to one skilled in the art that certain modifications may be made within the spirit of the invention as defined by the appended claims.

What is claimed is:

1. An apparatus for determining the astronomic orientation of a sensor placed on the surface of a planetary body comprising:
   a. support means for mounting the sensor in a fixed relationship relative to the local gravity vector;
   b. an optical system fixedly mounted within said sensor for detecting star radiation, including a lens having a limited field of view and a focal surface, and a stationary opaque disk having a predetermined pattern of slits, said disk mounted at the focal surface of said lens;
   c. conversion means connected to said optical system for converting detected star radiation into electrical signals; and
   d. time recording means responsive to said electrical signals for recording the time at which said detected star radiation is received by said conversion means.

2. An apparatus as claimed in claim 1 further comprising:
   a. a mechanical rotation means connected to said optical system for rotating said optical system about a rotation axis fixed relative to the direction of the gravitational vector;
   b. level detection means connected to said optical system for detecting the angular deviation of said rotation axis relative to said gravitational vector.

3. An apparatus as claimed in claim 2 further comprising data processing means electrically connected to said detector means and said time recording means, for identifying the sources of said star radiation and calculating the orientation of said sensor relative to the local gravity vector.

4. An apparatus as claimed in claim 3 wherein the pattern of slits on said opaque disk comprise a plurality of radial slits.

5. An apparatus as claimed in claim 4 wherein the radial slit pattern is positioned at the sagittal image surface of the optical system.

6. An apparatus for determining astronomical position and azimuth orientation on the surface of the earth comprising:
   a. support means for the mounting of an optical system in a fixed position relative to the earth's gravitation vector;
   b. an optical system for detecting star radiation, said optical system being mechanically supported by said support means in a vertical orientation and being nonmoving while said star radiation is detected;
   c. conversion means connected to said optical system for converting detected star radiation into electrical signals;
   d. time recording means responsive to said electrical signals for recording the time at which said detected star radiation is received by said conversion means.

7. An apparatus as claimed in claim 6 wherein the optical system further comprises:
   a. a lens having a limited field of view and a uniform focal surface;
   b. a stationary opaque disk having a predetermined pattern of slits, said disk mounted at the focal surface of said lens.

8. An apparatus as claimed in claim 7 further comprising:
   a. mechanical rotation means connected to said optical system for rotating said optical system about a rotation axis fixed relative to the direction of the gravitational vector;
   b. level detection means connected to said optical system for detecting the angular deviation of said rotation axis relative to said gravitational vector.

9. An apparatus as claimed in claim 8 further comprising data processing means electrically connected to said conversion means and said time recording means, for identifying the sources of said star radiation and calculating the orientation of said sensor relative to the local gravity vector.

10. An apparatus as claimed in claim 9 further comprising a variable shutter means mounted adjacent said opaque disk for limiting the amount of light impinging on said opaque disk and controlling the point of incidence where said light is permitted to impinge on said opaque disk.

11. An apparatus as claimed in claim 10 wherein the pattern of slits on said opaque disk comprise a plurality of radial slits.

12. An apparatus as claimed in claim 11 wherein the radial slit pattern is positioned at the sagittal image surface of the optical system.

13. An apparatus for determining latitude and longitude on the surface of the earth and north azimuth orientation comprising:
   a. an optical system for detecting star radiation, said optical system having a lens, and having mounted at the focal surface of said lens an opaque stationary disk, said disk having a plurality of slits;
   b. conversion means coupled to said optical system for detecting star radiation passing through said lens and said slits, and converting said star radiation into electrical signals;
   c. time recording means, activated by said electrical signals from said conversion means, for recording the time at which said star radiation is received;
   d. data processing means electrically connected to said conversion means and said time recording means, for identifying the source of said star radiation and calculating the latitude and longitude of said optical system, utilizing said star identities and said recorded times; and
   e. supporting means connected to said optical system for providing a stable mounting base relative to the local vertical earth's gravity vector.

14. A method of determining latitude, longitude, and azimuth on the surface of the earth comprising the steps of:
   a. observing at least three star transits through a stationary disk having a plurality of slits;
   b. recording the times of each of the star transits;
   c. identifying the transiting stars;
   d. calculating position and azimuth by utilizing the recorded transit times, and the space-position coordinates of the identified stars.

15. A method of determining latitude, longitude, and north azimuth orientation as claimed in claim 14 wherein the step of observing star transits further comprises:
   a. measuring the time-varying radiation passing through the slits;
   b. examining the measurements to identify pulse shapes which are characteristic of stars transiting slits.

16. A method of determining latitude, longitude, and north azimuth orientation as claimed in claim 15 wherein the step of recording the times of each of the star transits further comprises: examining the identified pulse shapes characteristic of stars transiting slits to determine the times corresponding to the pulse shape centers.

17. A method of determining latitude, longitude, and north azimuth orientation as claimed in claim 14 wherein the step of identifying the transiting stars further comprises:
   a. computing a time profile of known stars transiting the slits for a selected latitude, longitude, and north azimuth orientation;

b. comparing the computed time profile with the recorded times of star transits to determine whether substantial time coincidence exists;

c. varying the selected latitude, longitude, and north azimuth orientation utilized in step (a) by a predetermined amount;

d. repeating steps (a), (b), and (c) until substantial time coincidence exists.

18. A method of determining latitude, longitude, and north azimuth orientation as claimed in claim 14 wherein the step of observing star transits further comprises:

a. periodically recording digital values representative of instantaneous star intensities and background radiation;

b. sensing the recorded values to determine when the values form a pattern characteristic of a star transiting a slit.

19. A method of determining latitude, longitude, and north azimuth orientation as claimed in claim 18 wherein the step of recording the times of each of the star transits further comprises:

a. constructing a statistical curve to fit the sensed, recorded values characteristic of a star transiting a slit;

b. identifying the point of maximum amplitude on the constructed statistical curve; and c. utilizing the identified maximum amplitude point to determine the time when said maximum amplitude occurred.

* * * * *